United States Patent
De Moel et al.

(10) Patent No.: US 6,576,136 B1
(45) Date of Patent: Jun. 10, 2003

(54) METHOD AND APPARATUS FOR REMOVING FLOATING SUBSTANCES AND SALTS FROM A LIQUID BY MEANS OF A MEMBRANE FILTRATION

(75) Inventors: Petrus Jacob De Moel, Hoevelaken (NL); Walterus Gijsberrus Joseph Van Der Meer, Sneek (NL); Harm Van Dalfsen, Steenwijk (NL)

(73) Assignees: DHV Water B.V., Amersfoort (NL); N.V. Waterleiding Friesland, Leeuwarden (NL)

( * ) Notice: Subject to any disclaimer, the term of this patent is extended or adjusted under 35 U.S.C. 154(b) by 0 days.

(21) Appl. No.: 09/831,589
(22) PCT Filed: Nov. 12, 1999
(86) PCT No.: PCT/NL99/00696
§ 371 (c)(1), (2), (4) Date: May 11, 2001
(87) PCT Pub. No.: WO00/29099
PCT Pub. Date: May 25, 2000

(30) Foreign Application Priority Data

Nov. 13, 1998 (NL) .............................................. 1010544

(51) Int. Cl.⁷ .......................... B01D 65/02; B01D 65/08
(52) U.S. Cl. ............. 210/636; 210/321.69; 210/321.85; 210/639
(58) Field of Search ............................... 210/194, 195.2, 210/198.2, 321.65, 321.69, 321.76, 321.85, 636, 637, 650, 651, 702, 712, 805, 198.1, 639; 55/288

(56) References Cited

U.S. PATENT DOCUMENTS 3,992,301 A    11/1976   Shippey et al.
4,670,150 A *  6/1987   Hsiung et al. ............... 210/636
5,047,154 A *  9/1991   Comstock et al. .......... 210/636
5,147,552 A *  9/1992   Hlavacek et al. ........... 210/650
5,271,830 A * 12/1993   Faivre et al. ........... 210/321.69
5,690,830 A   11/1997   Ohtani et al. ............... 210/636
5,783,083 A    7/1998   Henshaw et al. ........... 210/636
5,888,401 A *  3/1999   Nguyen et al. ............. 210/650

FOREIGN PATENT DOCUMENTS

FR    2297660 A    8/1976

OTHER PUBLICATIONS

Cui Z F et al "Gas–Liquid Two–Phase Cross–Flow Ultrafiltration of BSA and Dextran Solutions" Journal of Membrance Science vol. 90, No. 1/02; Apr. 27, 1994; pp. 183–189.

* cited by examiner

Primary Examiner—Joseph Drodge
(74) Attorney, Agent, or Firm—J. Herbert O'Toole; Nexsen Pruet Jacobs & Pollard, LLC

(57) ABSTRACT

A membrane filtration for removing floating substances and salts from a liquid, uses vertically positioned capillary or tube membranes which are suitable for performing nano or hyper-filtration. Repeatedly and consecutively the following steps are performed: a) a permeate is produced without discharge of concentrate for a predetermined period of time; b) then a gas, for example air, is guided along side the membrane, at least almost without discharge of permeate and without discharge of concentrate; c) and finally a concentrate is discharged without discharge of permeate. During step a) and step c) use can be made of a combined supply of liquid and gas. An apparatus for performing this method is described as well.

17 Claims, 1 Drawing Sheet

METHOD AND APPARATUS FOR REMOVING FLOATING SUBSTANCES AND SALTS FROM A LIQUID BY MEANS OF A MEMBRANE FILTRATION

This application is a Section 371 of PCT/NL 99/00696 filed Nov. 12, 1999.

FIELD OF THE INVENTION

The invention relates in the first place to a method for removing floating substances and salts from a liquid by means of a membrane filtration.

BACKGROUND OF THE INVENTION

It is known, for removing salts from a liquid by means of nano filtration and reverse osmosis or hyperfiltration, to use spiral wound and hollow-fiber modules. Since, when using such spiral wound and/or hollow-fiber modules, the liquid has to be free from floating substances (since these modules could become clogged) a drastic precleaning of the liquid is necessary, for example by means of a sand filtration and/or micro-filtration or ultra filtration, respectively. This means that a two step method would be necessary.

One of the problems which are encountered with membrane filtration is the so-called concentration polarization of the components present (like salts, floating substances and other substances). Because of the liquid flow through a membrane (permeate production) salts are transported in the direction of the membrane. This brings about a concentration which is near the membrane higher than the average concentration in the bulk. This occurrence is called concentration polarization. When the solubility, product of the respective salt is exceeded, this salt tray precipitate onto the membrane and have a negative influence on the functioning of the membrane. The precipitation of the salt, can be prevented by adding chemicals (which comprises a reduction of the supersaturation in the bulk by adding an acid and/or an anti-precipitant) or by means of a so-called cross-flow operation.

The known two step method has several disadvantages. Both during the first step (sand filtration and/or microfiltration or ultra filtration, resp.) as well as during the second step (nano-filtration or hyper-filtration, respectively) a production of concentrate takes place. The total concentrate production which is finally obtained is therefore high. Furthermore, production with spiral wound and hollow fiber modules always takes place under continuous conditions (i.e, a continuous production of permeate and a continuous removal of concentrate) so as to decrease the concentration polarization as mentioned herein before. Such continuous operation conditions lead to a high energy consumption and, because of the pressure decrease (comprising a concentrate control valve) at the concentrate removal side, a significant energy loss is obtained. Finally, it is shown in practice that the spiral wound and/or hollow fiber-modules must be exchanged quite often, which renders installations which comprise such modules rather expensive in use.

BRIEF SUMMARY OF THE INVENTION

The invention aims to a method with which the disadvantages as mentioned herein above can be solved in a simple, but effective way.

To this end, the method according to the invention is characterized in that use is made only of vertically positioned, spiral wound and plate and frame type membranes which are suitable for nano- or hyper filtration, preferably capillary oz tube membranes, wherein repeatedly and consecutively the steps are performed which comprise:

a. producing a permeate without concentrate discharge during a predetermined period of time;

b. then guiding a gas, for example air, alongside the membrane, at least almost without permeate discharge and without concentrate discharge;

c. finally discharging concentrate without discharging permeate.

DETAILED DESCRIPTION OF THE INVENTION

Figure 1:
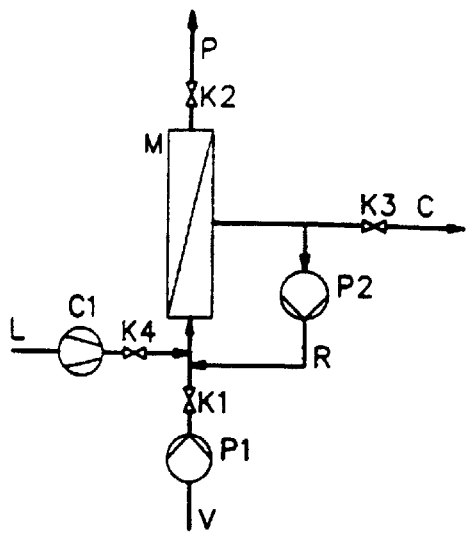
FIG. 1 is a schematic representation of the apparatus according to this invention.

According to the method of the invention the removal of floating substances and salts from the liquid in one step, without excessive precleaning, is performed. The capillary—or tube membranes (which for example have a diameter of 0.5 to 25 mm) are positioned vertically, so as to render it possible for using a gas (for example air) during subsequent step b.

During the first step (step a.) no removal of concentrate is taking place. As a result, near the membrane surface a so-called boundary layer will develop comprising a high particle/salt concentration (the so-called concentration polarization). This is acceptable for a short period of time, without the functioning of the respective membrane being influenced too negatively. It is possible to recirculate the concentrate during step a, without removal of concentrate. During the subsequent step (step b.) a flushing with gas is performed, which causes a mixing of the liquid in the capillary—or tube membrane—which causes a removal of the concentration polarization which has been obtained. During this flushing with air still no removal of concentrate takes place. Finally, during the last step (step c.). The removal of permeate is stopped and a switch is made so as to remove concentrate. In this way the floating substances which have been collected as well as the salts which have accumulated are removed. Then these steps are repeated.

Since there is use of a one step method, the concentrate-production is much lower than with any known method.

The discontinuous operation also uses less energy, while the exchange of filter modules reeds to be performed less frequently.

Within the scope of the invention there are several possibilities, one preferred embodiment of the method according to the invention, is to remove during step c. concentrate, which is performed by a combined liquid/gas-supply. In this case also the vertical position yields an advantage. The flushing of the liquid/gas alongside the membrane causes a high turbulence and a high water speed, as well as high shearing stresses respectively, across the membrane surface, which yields a very effective removal of contamination from the membrane. It is noted that this technique in itself is known from micro- and ultra filtration (like the so-called membranebioreactor).

Furthermore, there is a possibility that in a matter which is known per se, during step c. chemicals may be added to the liquid.

The method according to the invention can be performed in a very effective way, if during step b. the gas supply is at a pressure which is lower than the pressure during operation of step a. During step a., that is to say during production (of permeate), there is a high pressure, while during the flushing of gas during step b. there is a low pressure, during which the production is terminated for a short period of time. In principle this low pressure will be maintained during step c., such that a low energy consumption is obtained (the concentrate is removed in a discontinuous way and at a low pressure by means of: an open/stop valve, according to the invention, whereas according to the state of the art use is made of a throttle valve so as to decrease the initially high concentrate pressure, and which only is obtained with a high energy loss).

The production of permeate without removal of concentrate is allowable for a short period of time. However, if the concentration polarization obtains too high a value, step b. has to be initiated. In this respect, according to an embodiment of the method according to the invention, the time during which step a. is performed, is determined by the increase of the pressure resistance which the permeate encounters over the membrane. The higher the increase of the concentration polarization as well as the precipitation on the membrane surface, the more difficult the flow of permeate through the membrane will be, which also increases the pressure resistance. The determination of this pressure resistance for example may take place by means of the number of revolutions per minute of the liquid supplying pump, which number of revolutions decreases with increasing pressure resistance.

So as to increase the operation and the cleaning of the membranes, it is mentioned that pulverized charcoal and/or flocculants or other additives can be added. Besides it is possible that during step a. and/or during step b. and/or during step c. a recirculation of the concentrate over the membrane is performed. Such an addition of pulverized charcoal and/or flocculants and a possible recirculation of a concentrate over the membrane are known per se, which are performed also according to the state of the art (for example with micro- and ultra filtration).

The invention also relates to an apparatus for removing floating substances and salts from a liquid by means of a membrane filtration, comprising a liquid supply, a permeate discharge and a concentrate discharge.

According to the invention the apparatus is characterized by only comprising vertically positioned capillary or tube membranes which are suitable for performing nano- or hyper-filtration, a gas supply which is connected parallel to the liquid supply and which ends up in the liquid supply, control valves for opening and closing the liquid supply, gas supply, permeate discharge and concentrate discharge if necessary, as well as control means for controlling the control valves, such that consecutively:

a. during a previously determined time the liquid supply and permeate discharge are opened and the gas supply and the concentrate discharge are closed;
b. next only the gas supply is opened;
c. finally the permeate discharge is closed and at least the liquid supply and the concentrate discharge are opened.

With the apparatus of the invention the method as mentioned herein before can be performed.

According to a preferred embodiment the control means are such that during step c. the gas supply is opened as well.

The opening of the gas supply yields a combined liquid/gas supply. In this way, as mentioned herein before, an effective removal of membrane contamination can be obtained.

Embodiments of the apparatus according to the invention which are preferred are, among others: the use of a provision for, during step c., adding chemicals to the liquid, means for controlling the supply pressure of the gas and/or the liquid (such as for example the gas supply during step b. which takes place under a pressure which is. lower than the operation pressure during step a.), sensor means which are connected to the control means for determining the pressure resistance the permeate encounters across the membrane (for determining the optimum time for step a.), means for adding to the liquid pulverized charcoal and/or flocculants (which diminishes the clogging of the membrane), and the use of a recirculation pipe which connects the concentrate discharge pipe with the liquid supply pipe, so as to render it possible that both during step a. and during step b. and during step c. a recirculation of a concentrate can be performed so as to decrease the concentration polarization.

The invention will now be described by means of a drawing, which schematically shows an apparatus for performing the method according to the invention.

FIG. 1 schematically shows an apparatus for removing floating substances and salts from a liquid by means of membrane filtration. The apparatus comprises vertically positioned capillary or tube membranes M, for performing nano- or hyper-filtration, a liquid supply pipe v, a permeate discharge pipe P and a concentrate discharge pipe C. Parallel to the liquid supply pipe V, and terminating therein, an air supply pipe L is provided. For transporting the liquid and the air pump P1 and compressor C1 are provided, whereas further there are provided in the liquid supply pipe V, a control valve K1. In the permeate discharge pipe P there is provided a control valve K2. In the concentrate discharge pipe C there is provided a control valve K3, and in the air supply pipe L there is provided a control valve K4. Furthermore, a recirculation pipe R is shown, together with a pump P2, which recirculation pipe R connects the concentrate discharge pipe c with a liquid supply pipe V.

The recirculation pipe R as shown in FIG. 1 may be omitted if desired. The inventive method which can be performed by this apparatus is not dependent on this recirculation pipe. Referring to the FIGS. 2 to 4, this method will be described while not taking into account this recirculation pipe.

Before explaining the method which can be performed by means of this apparatus, the following is remarked. The control valves K1 to K4 (and the pump P1, compressor C1 and, if present, pump P2) are connected to control means which are not shown in the figure. These control means may comprise a control unit which is known per se such as a microprocessor etc.

Figure 2:
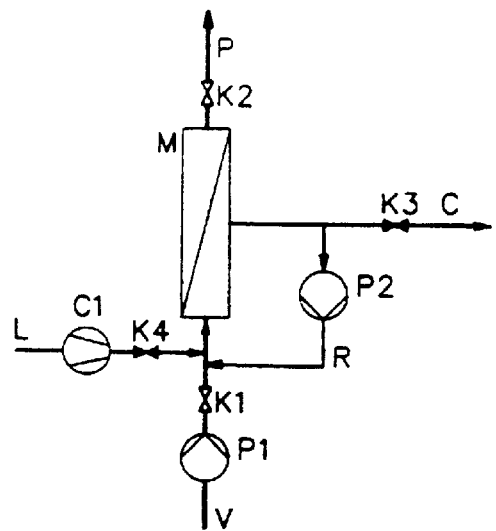
FIG. 2 illustrates the first step in the method according to this invention.

FIG. 2 shows the first step for performing the method according to the invention with the apparatus as shown. The control, valve K1 in the liquid supply pipe V and the control valve K2 in the permeate discharge pipe P are opened. The control valves K3 and K4 in the concentrate discharge pipe C and the air supply pipe L, respectively, are closed. By means of pump P1 at a high, operation pressure, liquid is supplied to the membrane M, such that a permeate is produced. This permeate is discharged through permeate discharge pipe P. Near the membrane a development of a boundary layer containing a high salt concentration (concentration polarization) is obtained. Also, floating substances are removed from the liquid.

Figure 3:
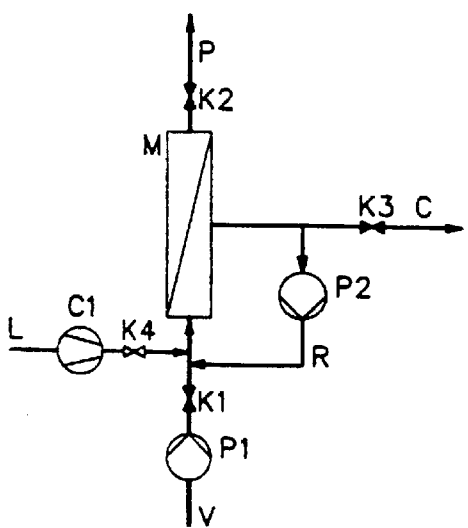
FIG. 3 illustrates the second step in the method according to this invention.

After some time the step as shown in FIG. 3, i.e. the second step, is performed. The period of time during which the first step is performed until the moment at which the second step is initiated, can be determined by means of the increase of the pressure resistance the permeate encounters across the membrane M. A basis for this may, for example, be the number of revolutions of pump P1. During the second step the control valves K1 and K2 in the liquid supply pipe V and the permeate discharge pipe P are closed. The control valves K3 in the concentrate discharge pipe C is still closed. The control valve K4 in the air supply pipe h however is opened, such that due to the vertical position of the membrane M, air is flown along the membrane and an air flush is performed. Due to this flushing with air there is a mixing of the liquid, such that the concentration polarization present is removed. This flushing with air does not take place during the high operation pressure (since the control valve K1 is closed then, as well), but it does take place under a, preferably, lower pressure. During this flushing with air, due to the closed control valve K3 in the concentrate discharge pipe C, still no concentrate is discharged. The amount of liquid which is displaced by the air, temporarily can be contained in an accumulator (not shown).

Figure 4:
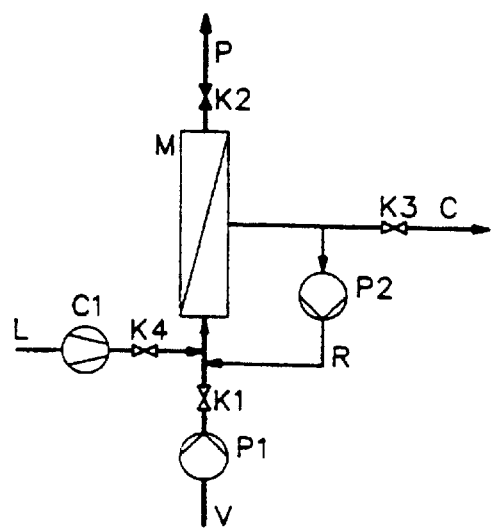
FIG. 4 illustrates the final step in the method according to this invention.

The last step for performing the method according to the invention is shown in FIG. 4. Usually control valve K2 in the permeate discharge pipe P is closed, while the other control valves K1, K3 and K4, are opened. Now, preferably under a low pressure, a combined flushing with both liquid and air along the membrane M takes place, so as to remove the floating substances as well as the salts, which have accumulated alongside the membrane.

After the step which is shown in FIG. 4 has ended again the step as shown in FIG. 2 is performed and the method is repeated. Therefore, the method is a discontinuous method comprising a discontinuous permeate production and a discontinuous concentrate discharge. since, during the step as shown in FIG. 4, a concentrate is discharged under a low pressure, only little energy loss is obtained. Furthermore, since a pre-cleaning (for example sand filtration and/or micro filtration or ultra filtration, respectively) does not need to be performed, a lower concentrate production is obtained than according to the method which is known from the state of the art.

Supply pipes, for the supply of chemicals, pulverized coal and/or flocculants, which end up into the liquid supply pipe v are not shown in the figures. The effect of these substances is known from itself from the state of the art (micro/ultra filtration).

As mentioned herein before, in the embodiment according to the FIGS. 2 to 4 a recirculation pipe R can be used, which can help to reduce the concentration polarization.

It is evident that the means for controlling the supply pressure of the air and the liquid may form part of the pump P1 and compressor C1.

The invention is not restricted to the embodiment as shown herein before, which within the scope of the invention as determined by the claims, can be varied in many ways,

What is claimed is:

1. Method for removing floating substances and salts from a liquid by means of membrane filtration, characterized, in that use is made only of vertically positioned spiral wound and/or plate and frame type tubular membranes, which are pore sized for nano or hyper-filtration, and wherein repeatedly and consecutively the steps are performed which comprise:

a. producing a permeate without concentrate discharge during a predetermined period of time;

b. guiding a gas through the membrane, with minimal permeate discharge and without concentrate discharge; and c. discharging concentrate without discharging permeate.

2. Method according to claim 1, characterized, in that during step c. concentrate is discharged by a combined liquid/gas supply.

3. Method according to claim 2, characterized, in that during step c. chemicals are added to the liquid.

4. Method according to claim 1, characterized, in that during step b. the supply of gas is performed at a pressure which is lower than the operational pressure during step a.

5. Method according to claim 1, characterized, in that the period of time during which step a. is performed, is determined by means of the increase of the pressure resistance the permeate encounters across the membrane.

6. Method according to claim 1, characterized, in that pulverized charcoal and/or flocculants are added to the liquid.

7. Method according to claim 1, characterized, in that during step a. and/or step b. and/or step c. a recirculation of a concentrate across the membrane is performed.

8. A method according to claim 1 wherein said gas is air.

9. A method according to claim 1 wherein said membranes are capillary membranes.

10. Aparatus for removing floating substances and salts from a liquid by means of membrane filtration, concentrate discharge pipe, characterized by comprising vertically positioned spiral wound and/or plate and frame type tubular membranes, and which are pore sized for nano or hyper-filtration, a gas supply pipe which is connected parallel to the liquid supply pipe and terminating in the liquid supply pipe, control valves for opening and closing the liquid supply pipe, the gas supply pipe, a permeate discharge pipe and a concentrate discharge pipe, and further comprising control means for controlling the control valves, such that repeatedly and consecutively:

a. the liquid supply pipe and the permeate discharge pipe are opened and the gas supply pipe and the concentrate discharge pipe are closed, during a previously determined period of time;

b. the gas supply pipe only is opened; and c. the permeate discharge pipe is closed and at least the liquid supply pipe and the concentrate discharge pipe are opened.

11. Apparatus according to claim 10, characterized, in that the control means are such that during step c. the gas supply pipe is opened as well.

12. Apparatus according to claim 11, characterized, in that means are provided for adding, during step c., chemicals to the liquid.

13. Apparatus according to claim 10, characterized, in that means are provided for controlling the supply pressure of the gas and/or liquid.

14. Apparatus according to claim 10, characterized, in that sensor means are connected to the control means for determining the pressure resistance which is encountered by the permeate across the membrane.

15. Apparatus according to claim 10, characterized, in that means are provided for adding pulverised coal and/or flocculants to the liquid.

16. Apparatus according to claim 10, characterized, in that a recirculation pipe which connects the concentrate discharge pipe with the liquid supply pipe is provided.

17. An apparatus according to claim 10 wherein said membranes are tubular membranes.

* * * * *